Jan. 1, 1935. J. RORVIK 1,986,752
SELF GOVERNED WIND MOTOR
Filed Aug. 7, 1933 2 Sheets-Sheet 1
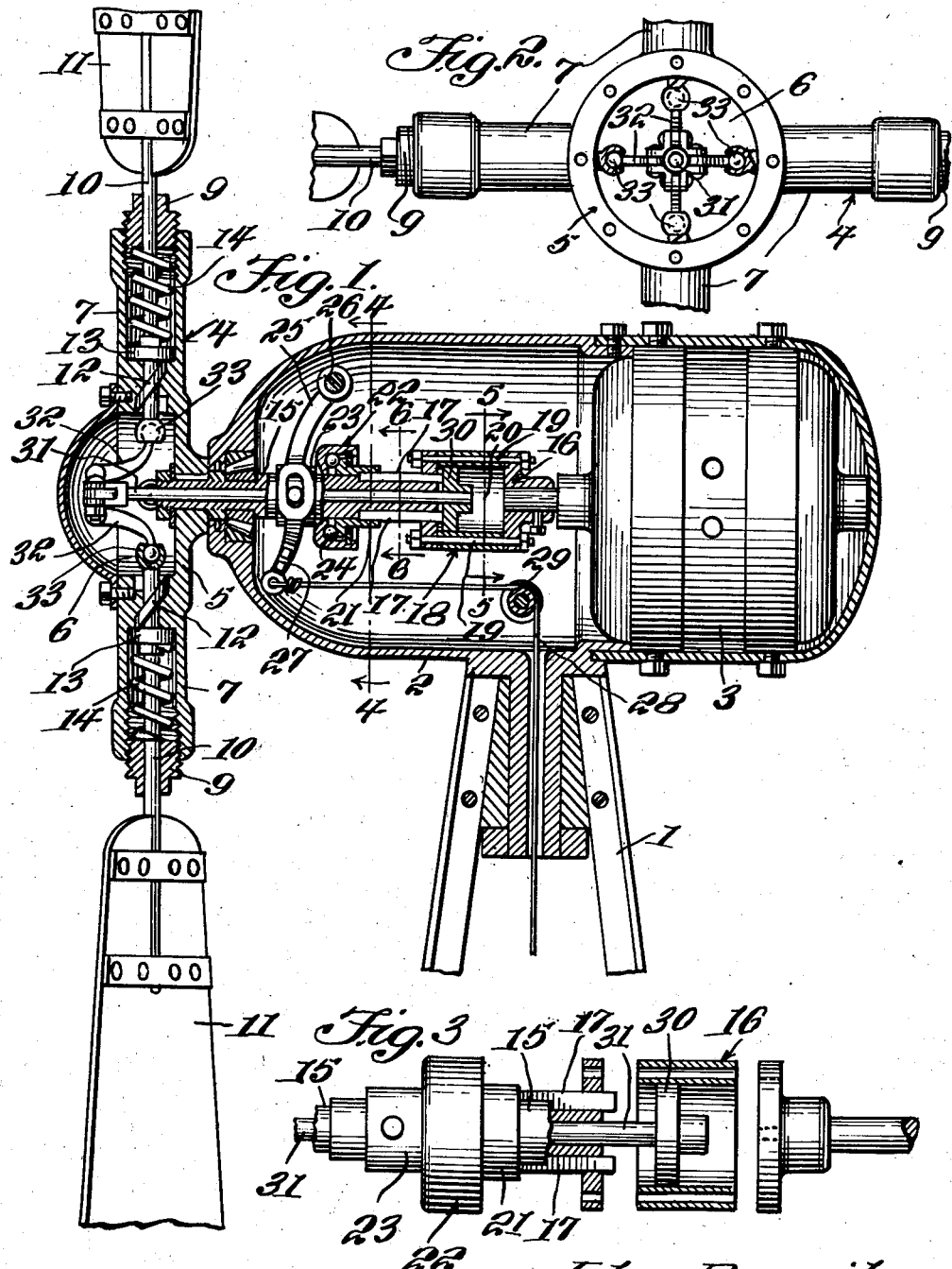

Jan. 1, 1935.  J. RORVIK  1,986,752
SELF GOVERNED WIND MOTOR
Filed Aug. 7, 1933  2 Sheets-Sheet 2
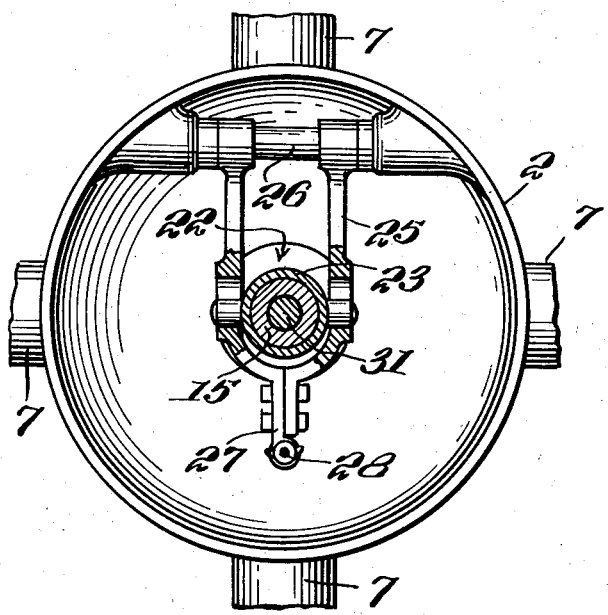
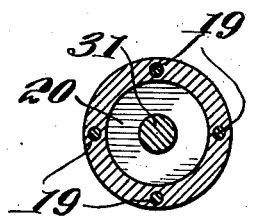
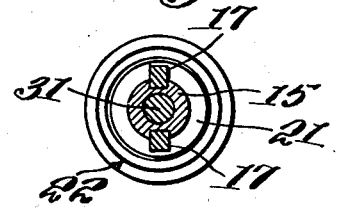
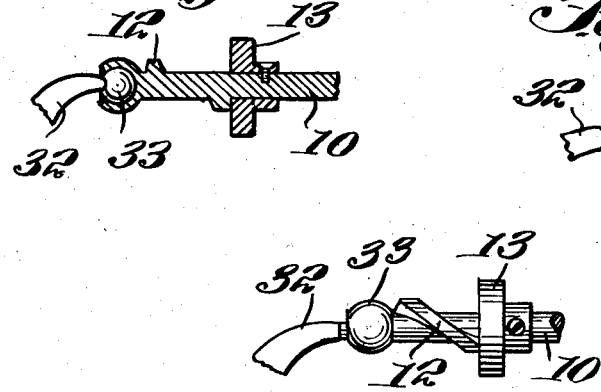
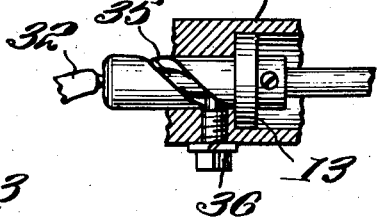

Patented Jan. 1, 1935

1,986,752

UNITED STATES PATENT OFFICE 1,986,752

SELF-GOVERNED WIND MOTOR

John Rorvik, Watkins, Mont.

Application August 7, 1933, Serial No. 684,057

2 Claims. (Cl. 170—68)

This invention relates to self-governed wind motors and has for the primary object, the provision of a wind wheel having automatic means for varying the pitch of the blades of the wind wheel in accordance with the velocity of the wind so as to maintain the rotation of the wind wheel at approximately a given speed under a predetermined load.

Another object is the provision of means for varying the load on the wind wheel to regulate the speed of rotation thereof in addition to the automatic means and also permit stopping of the wind wheel when desired.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a self-governed wind motor constructed in accordance with my invention.

Figure 2 is a fragmentary front elevation partly in section illustrating an equalizer between the blades of the wind wheel.

Figure 3 is a fragmentary sectional view illustrating a portion of the load varying means and coupling between the wind wheel and the device driven by said wheel.

Figure 4 is a sectional view taken on the line 4—4 of Figure 1.

Figure 5 is a sectional view taken on the line 5—5 of Figure 1.

Figure 6 is a sectional view taken on the line 6—6 of Figure 1.

Figure 7 is a fragmentary sectional view illustrating a portion of a blade shaft.

Figure 8 is a fragmentary plan view illustrating the same and showing the spiral rib thereon.

Figure 9 is a fragmentary sectional view illustrating a modified form of my invention.

Referring in detail to the drawings, the numeral 1 indicates a stand rotatably supporting a housing 2 in which is mounted a generator 3 driven by a wind wheel 4 forming the subject matter of the present invention. The wind wheel 4 consists of a hub 5 having a chamber 6 and radially extending tubular members 7 in communication with the chamber. The chamber opens outwardly through one face of the hub and is normally closed by a removable cover 8. The members 7 are internally screw threaded to receive adjusting bearings 9 which rotatably support blade shafts 10, the inner ends of which extend into the chamber 6 and have secured to their outer ends blades 11. The shafts 10 are provided with spiral ribs 12 fitting in spiral grooves formed in the members 7 for moving the shafts inwardly and outwardly with respect to the hub 5 during opposite rotations of the shafts. Collars 13 are fixed to the blade shafts 10 and form seats for coil springs 14 which bear against the adjusting bearings 9. The action of the springs is to normally urge the shafts 10 inwardly with respect to the hub which causes rotation of the shafts in one direction to properly position the blades for action upon by the wind, and during the rotation of the wind wheel, the centrifugal force of the blades and blade shafts have a tendency to rotate the blades in the opposite direction to compress the springs 14 and thus cause a change in the pitch of the blades and thereby maintain the rotation of the wind wheel at a given speed.

A tubular shaft 15 is journaled in the housing and extends outwardly of the latter and has the hub 5 of the wheel secured thereto. The shaft 15 has a coupling 16 connected thereto by keys 17 and the coupling is in turn connected to the generator 3. The coupling consists of end plates with a sleeve 18 positioned therebetween. The end plates and sleeve are connected by tie bolts 19. The end plates and sleeve cooperate in forming a chamber 20. The keys 17 fit within the grooves of the shaft 15 and extend through one of the heads of the coupling and also enter grooves or notches of a section 21 of a bearing 22. The bearing 22 also includes a section 23 journaled on the shaft 15 and cooperating with the section 21 in forming recesses for ball bearings 24. A fork 25 is pivoted to the housing 2, as shown at 26, and is pivotally and slidably connected to the section 23 of the bearing 22 and terminates in an arm 27 to which a control cable 28 is connected. The cable 28 is trained over a pulley 29 and extends downwardly through the stand 1 for the purpose of having attached thereto weights of different sizes so that the load on the shaft 15 may be varied. The cable 28 also may be employed as a medium for stopping the rotation of the wind wheel. The movement of the fork 25 in one direction or under a pull upon the cable 28 causes an endwise movement of the keys 17, forcing them against a disc 30 confined within the chamber of the coupling 18 and secured to an equalizing shaft 31. The equalizing shaft is journaled in the tubular shaft 15 extending into the hub 5 of the wheel and has pivotally connected thereto links 32 which are in turn connected to the inner end of the blade shafts 10 by universal joints 33. The keys pressing upon the disc 30 urges the shaft 31 towards the generator 3, causing the links 32 to exert pressure in an outward direction upon the blade shafts which is in opposition to the action of the springs 14, consequently turning said blade shafts in a direction to feather the blades and thereby decrease the rotation of the wind wheel by the wind currents.

The action of the springs 14 on the blade shafts may be varied by adjusting the bearings 9.

In operation, the springs 14 normally position the blades to be acted upon by a wind current and as the velocity of the wind increases to rotate the wind wheel above a predetermined speed, the force of the air currents turns the blade shafts in opposition to the action of the springs, causing the blades to feather in the wind currents and thereby reduce the speed of the wind wheel. In order to cause the blades to either feather or move into the wind in unison the equalizer is provided between the blade shafts consisting of the links 32 and the shaft 31.

As shown in Figure 9 each blade shaft 10 may be equipped with a spiral groove 35 instead of a spiral rib as in the other form of my invention and a set bolt 36 carried by the member 7 of the hub fits within the spiral groove to cause rotation of the blade shafts when moved endwise either by the wind currents or the action of the springs 14.

While I have shown and described the preferred embodiment of my invention, it will be understood that minor changes in construction, combination and arrangement of parts may be made without departing from the spirit and scope of my invention, as claimed.

Having described the invention, I claim:—

1. A wind motor including a stand and a tubular shaft secured thereto, a hub secured to the shaft and having a chamber, radially extending tubular members integral with the hub and in communication with the chamber and having spiral grooves, bearings threaded in the tubular members, blade shafts journaled in the bearings and the tubular members and extending into the chamber, blades secured to the blade shafts, spiral ribs on the blade shafts and fitting the spiral grooves, collars secured to the blade shafts and located within the tubular members, coil springs between the bearings and collars for feathering the blades and to act in opposition to the centrifugal action of the blades and blade shafts during the rotation thereof, links in the chambers, universal connections between the links and the blade shafts, and an equalizing shaft pivoted to the links and slidable into the tubular shaft.

2. A wind motor including a stand and a tubular shaft secured thereto, a hub secured to the shaft and having a chamber, radially extending tubular members integral with the hub and in communication with the chamber and having spiral grooves, bearings threaded in the tubular members, blade shafts journaled in the bearings and the tubular members and extending into the chamber, blades secured to the blade shafts, spiral ribs on the blade shafts and fitting the spiral grooves, collars secured to the blade shafts and located within the tubular members, coil springs between the bearings and collars for feathering the blades and to act in opposition to the centrifugal action of the blades and blade shafts during the rotation thereof, links in the chambers, universal connections between the links and the blade shafts, an equalizing shaft pivoted to the links and slidable in the tubular shaft, keys secured to the shaft, a tubular coupling element connected to the tubular shaft by said keys and having the equalizing shaft extending therein, said keys extending into the tubular coupling element and having a slidable relation thereto, a brake disc secured to the equalizing shaft and confined within the tubular coupling element and engaged by said keys, and means for imparting endwise movement to the keys for increasing and decreasing their action upon the brake disc.

JOHN RORVIK.